(No Model.)

A. WARNOCK.
Spring Gear for Carriages.

No. 235,920.    Patented Dec. 28, 1880.

Witnesses.

Lewis Tomlinson.
Chas. W. Baldwin.

Inventor.

Adam Warnock
by Ridout Aird & Co
Attys

UNITED STATES PATENT OFFICE.

ADAM WARNOCK, OF GALT, ONTARIO, CANADA.

SPRING-GEAR FOR CARRIAGES.

SPECIFICATION forming part of Letters Patent No. 235,920, dated December 28, 1880.

Application filed November 10, 1880. (No model.)

*To all whom it may concern:*

Be it known that I, ADAM WARNOCK, a subject of the Queen of Great Britain, residing at Galt, in the county of Waterloo, in the Province of Ontario, Canada, manufacturer, have invented new and useful Improvements in Spring-Gears for Carriages, of which the following is a specification.

My invention relates to a spring-support more particularly applicable to the class of springs known as the "Ludlow" spring; and it has for its object the providing of a more solid and permanent support than is now used.

It consists in supporting the spring-shackles to the axles by the shank of the shaft-coupling or draw-jack passing through a hole in a lug made on the axle, and supporting on either side thereof an arm of the shackle, as hereinafter more particularly explained.

Figure 1:
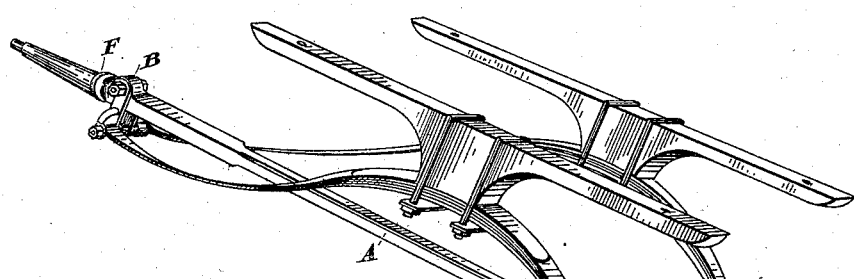
Figure 2:
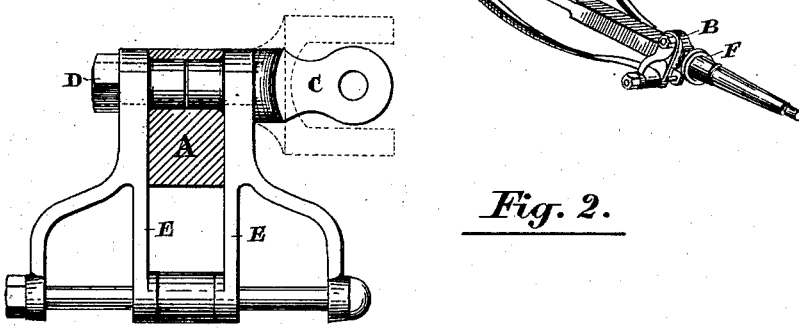
Figure 3:
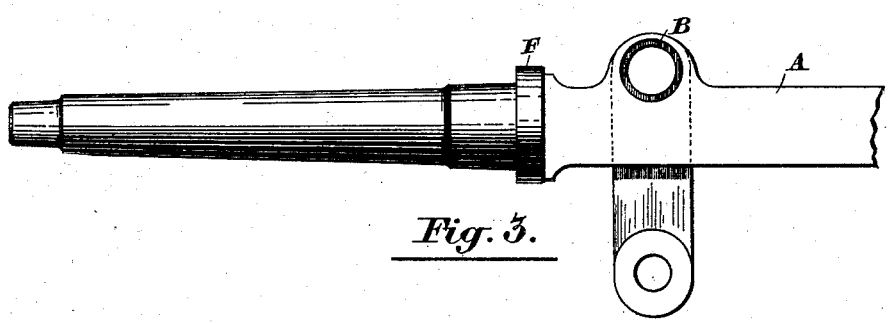

Figure 1 is a perspective view of the axle, spring, and supporting-shackle. Fig. 2 is a detail of the shackle and draw-jack. Fig. 3 is a detail of the axle, showing the lug.

As now arranged, the Ludlow spring is supported by malleable shackles clipped onto the axle. These, it will be understood, soon wear loose, are easily broken, and, owing to the manner in which they are secured to the axle, cannot be placed as closely to the wheel as is desirable for strength.

It will be noticed in the accompanying drawings that the axle A has forged upon it a lug, B, situated close to the collar F. The shaft-coupling or draw-jack C is provided with a shank secured at one end to receive the nut D.

As shown in the drawings, the shackle E is a double one, for carrying a spring on either side of the axle. Of course, in cases where the Ludlow spring-gear is not used, a single shackle may be sufficient. The shackle E is provided with an arm, through which a hole, corresponding with that in the lug B, is made. Through these holes the shank of the draw-jack C is passed, and the whole securely screwed together by the nut D.

A jam-nut may be provided, if thought necessary, or any other device usually employed for locking the nut in position may be used.

What I claim as my invention is—

A lug, B, forged or otherwise formed upon the axle A near the collar F, in combination with a draw-jack, C, provided with a shank and supporting the shackle E, substantially as specified.

ADAM WARNOCK.

Witnesses:
C. F. STEWART,
GEO. A. REID.